United States Patent [19]
Scott et al.

[11] Patent Number: 6,086,042
[45] Date of Patent: Jul. 11, 2000

[54] FLUID RESISTANT SOLENOID ACTUATED VALVE

[75] Inventors: Russell D. Scott, Peru; Dennis A. Dobnick, Fort Wayne, both of Ind.

[73] Assignee: Wabash Magnetics, Inc., Wabash, Ind.

[21] Appl. No.: 09/057,145

[22] Filed: Apr. 8, 1998

[51] Int. Cl.[7] ............................... F16K 31/06; H01F 5/09
[52] U.S. Cl. ................... 251/129.15; 335/255; 335/278; 335/282; 335/299; 29/605; 29/890.12
[58] Field of Search .................. 251/129.07, 129.15; 335/255, 260, 278, 282, 299; 336/198; 29/602.1, 605, 606, 890.14, 890.12

[56] References Cited

U.S. PATENT DOCUMENTS

| | | |
|---|---|---|
| 3,262,027 | 7/1966 | Zaleske et al. ................ 251/129.15 X |
| 3,593,241 | 7/1971 | Ludwig ........................... 251/129.15 X |
| 3,598,360 | 8/1971 | Merriner et al. . |
| 3,757,263 | 9/1973 | Saarem et al. ................ 251/129.15 X |
| 4,044,324 | 8/1977 | Coors ....................................... 335/260 |
| 4,087,773 | 5/1978 | Jencks et al. . |
| 4,230,156 | 10/1980 | Frantz . |
| 4,475,711 | 10/1984 | Rountry .......................... 251/129.15 X |
| 4,717,116 | 1/1988 | Ishigaki . |
| 4,728,916 | 3/1988 | Fontecchio et al. ................ 335/255 |
| 4,805,870 | 2/1989 | Mertz .................................. 251/129.15 |
| 4,817,914 | 4/1989 | Pick et al. ........................ 251/129.15 |
| 4,967,996 | 11/1990 | Sonoda et al. . |
| 5,002,253 | 3/1991 | Kolchinsky et al. . |
| 5,174,336 | 12/1992 | Casey et al. . |
| 5,218,999 | 6/1993 | Tanimoto . |
| 5,238,224 | 8/1993 | Horsting . |
| 5,246,033 | 9/1993 | Brehm et al. . |
| 5,311,162 | 5/1994 | Sjoquist et al. . |
| 5,358,215 | 10/1994 | Buth et al. . |
| 5,464,191 | 11/1995 | Shenk . |
| 5,538,220 | 7/1996 | LaMarca . |

*Primary Examiner*—John Rivell
*Attorney, Agent, or Firm*—Woodard, Emhardt, Naughton, Moriarty & McNett Patent and Trademark Attorneys

[57] ABSTRACT

A fluid resistant solenoid actuated valve having a unitary bobbin and valve housing. The unitary housing defining a valve seat connection assembly adjacent the fluid connection end. A portion of the bobbin housing being deformable upon application of a coil winding to secure a solenoid core placed in the housing. The coil having a pair of electrical leads extending over substantially the length of the coil. The coil and leads are encapsulated to provide fluid resistance.

21 Claims, 5 Drawing Sheets

FLUID RESISTANT SOLENOID ACTUATED VALVE

BACKGROUND OF THE INVENTION

This device relates generally to electrically operated devices and more particularly to an improved solenoid device which may assume the form of a solenoid actuator or solenoid valve. Such devices find application in a number of areas for controlling fluid flow, including industrial applications, automotive, irrigation, etc.

A solenoid device comprises an electrical coil which when energized, produces an electromagnetic field that is utilized to perform some function. In the case of a solenoid actuator, the electromagnetic field is utilized to move a magnetic armature. A solenoid valve is essentially a solenoid actuator having a portion thereof adapted for controlling fluid flow.

U.S. Pat. No. 5,311,162 discloses a valve actuator solenoid with an encapsulated coil removably mounted on a central core and an armature controlling fluid flow through the valve. The patent discloses that it is desirable that the coil be removable in the event its fluid isolation structures are penetrated allowing fluid to reach the coil and thereby inhibit coil function.

U.S. Pat. No. 5,358,215 discloses another solenoid actuated valve for controlling air flow in an automatic suspension system for a vehicle. This patent discloses winding the coil on a housing over the core and plunger area. The core is fixedly attached inside the internal passageway to prevent its movement during operation. The patent discloses a valve having an internal passage that extends the full length of the housing with apertures on both ends. The first aperture is for coupling to a fluid supply source, while the second aperture permits the flow of air to the suspension in the automobile.

One disadvantage of the above described solenoid valve is that the internal valve seat is formed in the molding process of the valve housing. This molding process requires high tolerances to produce a valve seat that will precisely mate with the corresponding surface on the plunger to form an air-tight seal. Further, once molded, the valve seat cannot be replaced when worn or modified for alternative applications. Moreover, the electrical connection for energizing a coil is located adjacent the fluid connection point such that the device is not suitable for many applications since any fluid leaking at the fluid connection point would exit the device adjacent the electrical leads and potentially damage the electrical components of the solenoid actuated valve.

Accordingly, there remains a need for a simple, substantially fluid resistant solenoid actuated valve that is adaptable to a number of different systems.

SUMMARY OF THE INVENTION

The present invention provides an improved solenoid actuated valve assembly. The assembly comprises a unitary valve housing having a longitudinal axis, an external surface and an internal surface defining an internal passageway extending along at least a portion of the longitudinal axis from a closed end to an opposite open end. The unitary valve housing further includes a valve connection assembly adjacent the open end. The external surface of the housing defines a bobbin area coaxial with the longitudinal axis. A core is disposed within the internal passageway adjacent the closed end. A reciprocable plunger is slidably disposed within the internal passage with a distal end positioned adjacent the core and an opposite proximal end having a first valve member. An energizing coil is supported on the bobbin area in a coaxial relationship with at least a portion of the internal passageway. A second valve member is interconnected with the valve connection assembly. The first valve member selectively engaging the second valve member to control fluid flow between the first valve member and second valve member.

A further aspect of a solenoid actuated valve assembly according to the present invention comprises a valve housing having a longitudinal axis, the housing defining an internal passageway extending along the longitudinal axis and an external surface defining a bobbin area having a deformable portion. A core is disposed within the internal passageway with at least a portion of the core disposed within the bobbin area adjacent the deformable portion. A coil is supported on the bobbing area and deforms the deformable portion into contact with the core. The housing deformation maintains the coil in position within the internal passageway.

The present invention further contemplates a method for assembling a fluid resistant solenoid actuated valve. The method comprises providing a unitary bobbin and valve assembly. The assembly has a longitudinal axis and defines an interior passageway extending along the longitudinal axis adapted to receive a magnetically responsive core and plunger. The interior passageway has an open end for a fluid connection and an opposite closed end. A core is inserted into the interior passageway and positioned adjacent the closed end with a portion thereof extending within the bobbin area. An electrical conductor is wound around the bobbin area to form a coil. A plunger and valve assembly is inserted into the interior passageway. A valve seat is inserted and secured in the interior passageway to complete the substantially fluid tight solenoid actuated valve assembly.

One object of the present invention is to provide an improved solenoid actuated valve.

Another object of the present invention is to provide a solenoid actuated valve having valve components that may be replaced without disturbing the fluid isolation elements of the device.

Still a further object or the present invention is to provide a method for assembling a fluid resistant solenoid actuated valve.

These and other objects of the present invention will become apparent from the following description.

DESCRIPTION OF THE PREFERRED EMBODIMENT

Figure 1:
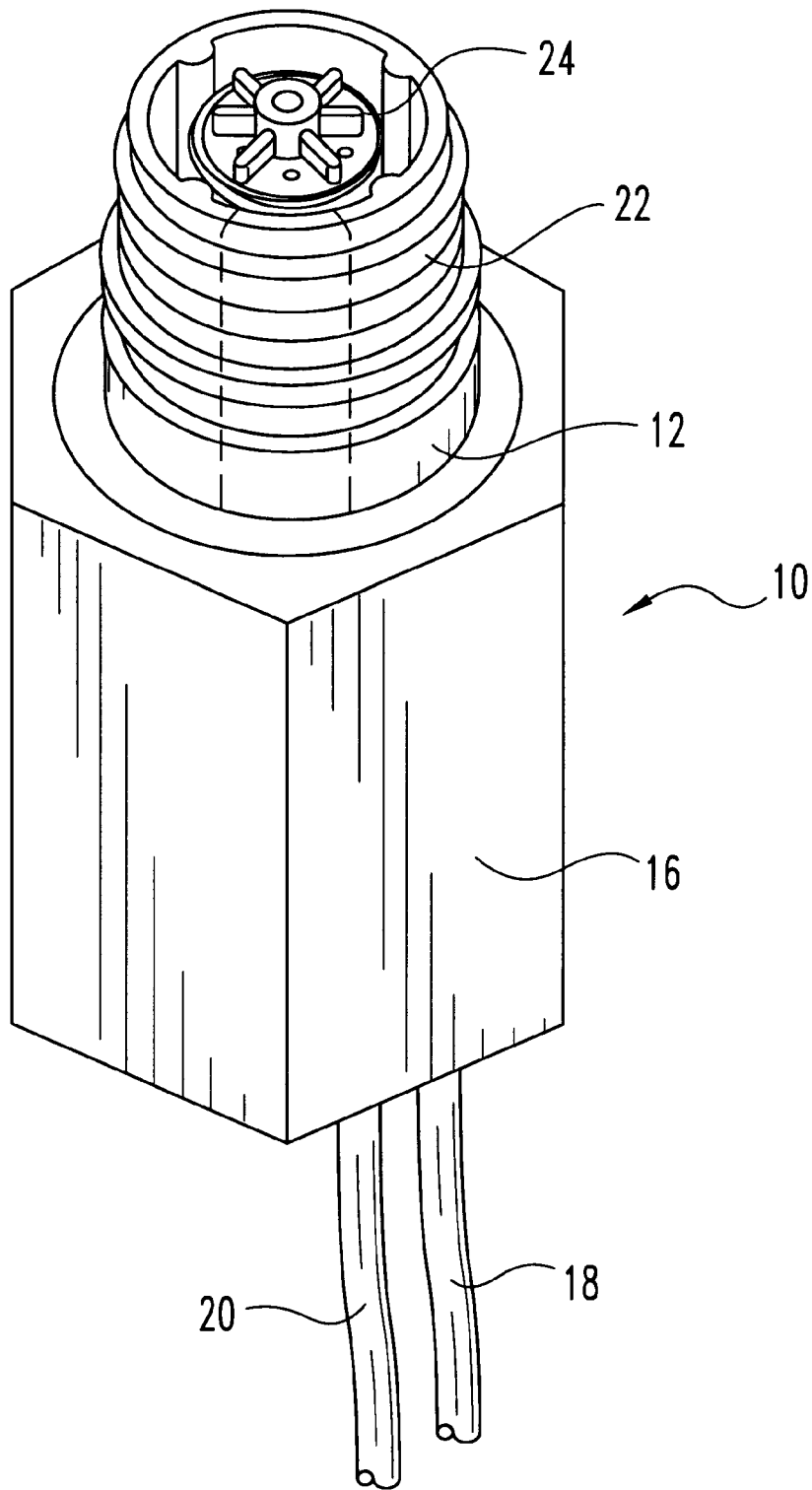
FIG. 1 is a perspective view of a solenoid actuated valve according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
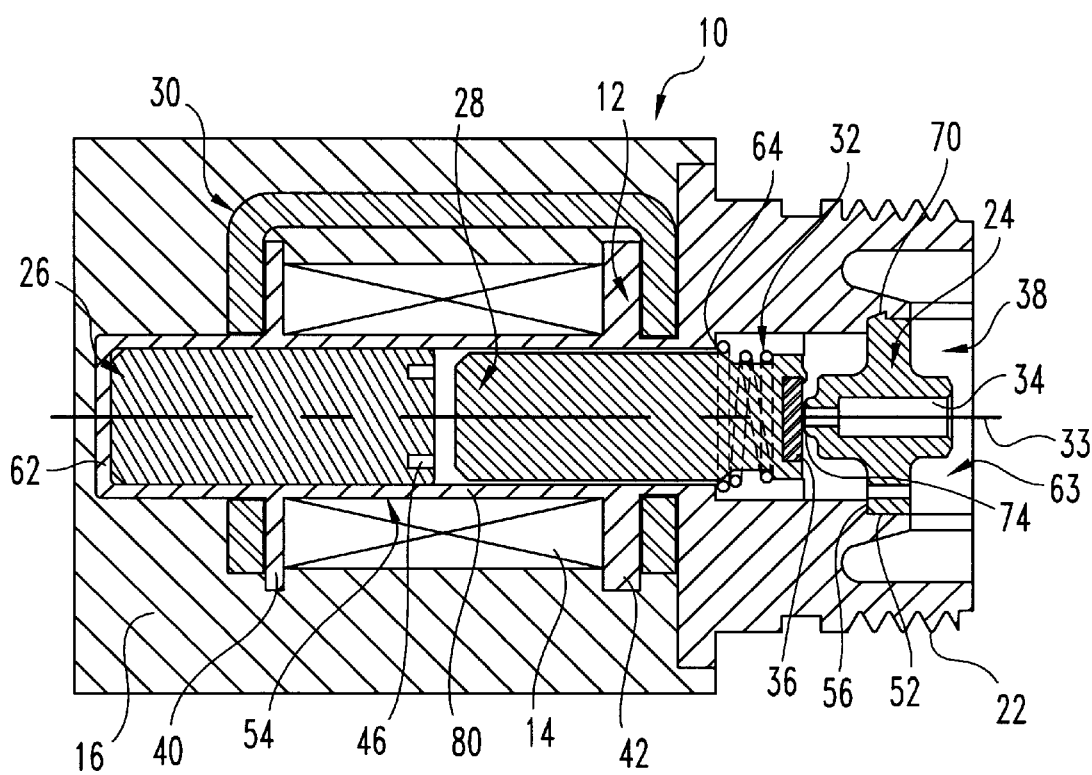
FIG. 2 is a cross-sectional view of the solenoid actuated valve of FIG. 1.

Referring now to the drawings, specifically FIGS. 1 through 4, there is illustrated an improved solenoid actuated valve device 10 according to the present invention. This solenoid device comprises a unitary bobbin and valve housing 12. Referring to FIG. 2, the unitary bobbin and valve housing 12 defines a first rib 40 and a second rib 42 defining bobbin area 54 on the external surface of the housing. Housing 12 further defines electrical lead supports 58 and 60 (FIGS. 3 and 4) disposed adjacent second rib 42. An externally threaded area 22 is formed adjacent the open end of housing 12 for mating to a fluid source by connection with a corresponding internally threaded member (not shown).

In addition to the external features, the unitary bobbin and valve housing 12 defines an internal passageway 38 extending substantially the length of the valve housing along its longitudinal axis 33. Within internal passageway 38 is further defined a valve connection assembly 50 (FIG. 4) adjacent open end 63 of internal passageway 38. Valve connection assembly 50 is adapted to removably receive at least a portion of the valve components. Valve connection assembly 50 includes a valve seat retaining groove 52 and is separated into individual extensions by slots 51. It being understood that slots 51 provide connection assembly 50 with sufficient flexibility to move outwardly to permit passage of a valve seat into groove 52. Moreover, although valve connection assembly 50 is fashioned for snap fit engagement, it is contemplated that threaded or other valve connection assemblies could be formed and remain within the spirit of the invention. Internal passageway 38 includes an end wall 62 to prevent the passage of fluid through the device except through open end 63 of internal passageway 38. The entire housing 12 is preferably formed of molded 6/6 nylon with 13% glass reinforcement. Although this particular material is used in a preferred embodiment, as known in the art, other materials could be used provided they have suitable characteristics for an intended application.

Figure 3:
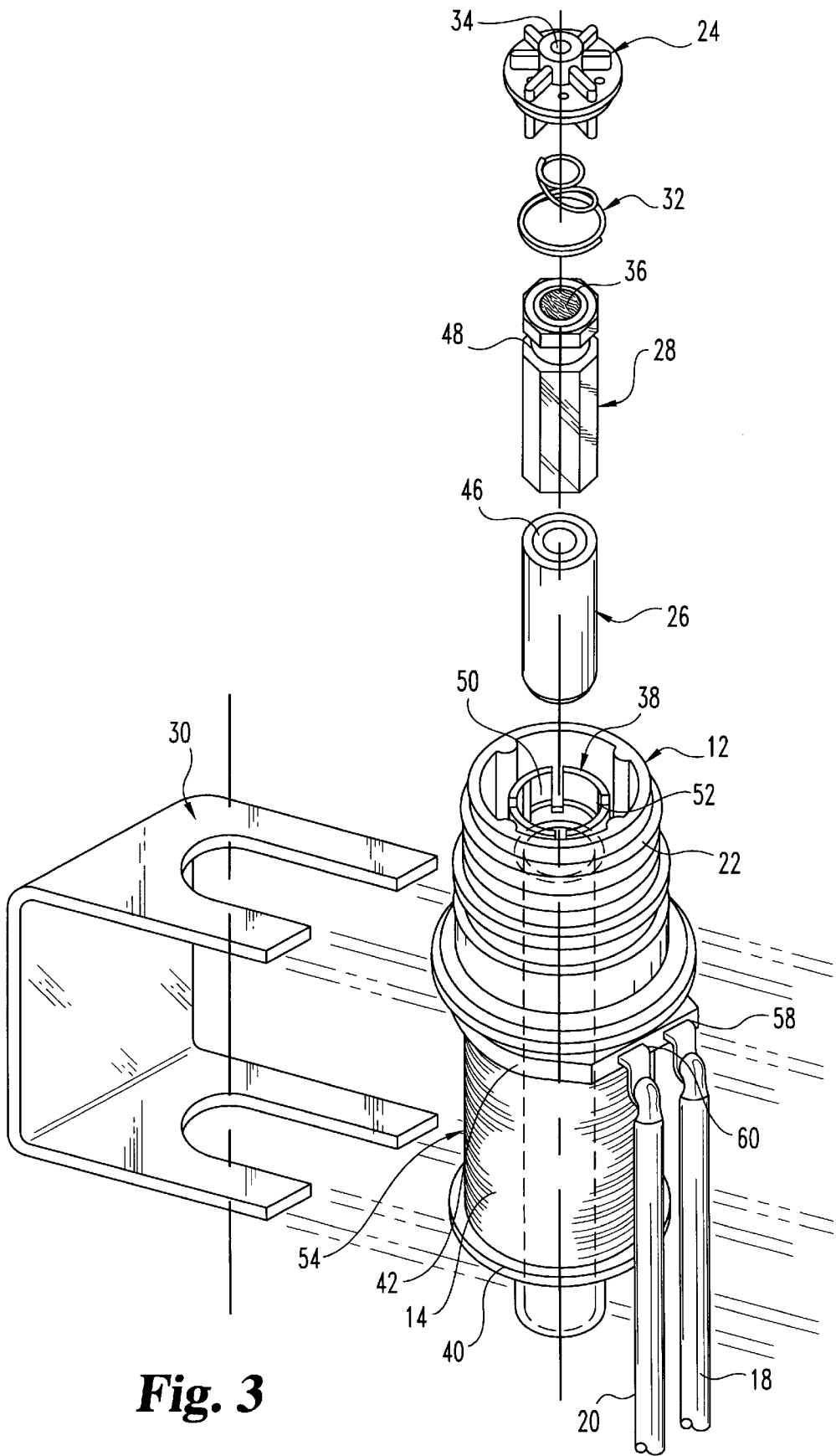
FIG. 3 is an exploded view of the solenoid actuated valve of FIG. 1.

As shown in FIGS. 2 and 3, a coil 14 of electrically conductive wire is wound about housing 12 in bobbin area 54 defined between ribs 40 and 42. As is common in the art, a pair of electrical leads 18 and 20 are attached to coil 14 for connection to an electrical power source (not shown) for energizing coil 14. A portion of coil 14 is surrounded by a magnetically responsive U-bracket 30. In a preferred embodiment, the U-bracket 30 is formed of C1018 cold rolled steel. The electrical leads 18 and 20 are supported by electrical lead supports 58 and 60 (FIGS. 3 and 4), respectively, defined in the exterior surface of bobbin and valve housing 12.

A core 26 is disposed within internal passageway 38 adjacent end wall 62. As known in the art, core 26 is made of 430F stainless steel for corrosion resistance and includes a short ring 46 (FIG. 5) made of copper for use with alternating current applications. However, it is understood and contemplated that the core could be configured for direct current applications as well. A plunger 28 is slidably disposed within internal passageway 38. A spring 32 is disposed between internal shoulder 64 defined in the fluid passageway and recess 48 defined in plunger 28. Spring 32 is positioned to urge plunger 28 into a position extending toward the opened end of internal passageway 38. It will be further understood that when coil 14 is energized, plunger 28 will be attached to core 26 by a force sufficient to overcome the spring force of spring 32. Plunger 28 further includes Buna-N valve pad 36 for mating with corresponding valve components. Although a Buna-N material is used in the preferred embodiment, other suitable materials could be substituted as known in the art.

As shown in FIG. 3, the external surface of plunger 28 is a substantially hexagonal shape, such that insertion within substantially cylindrical internal passageway 38 defines a series of fluid passageways between the interior wall of the passage and the exterior surface of the plunger. It will be understood that plunger 28 may alternatively have a series of semi-circular fluid channels broached into the exterior surface to provide for fluid flow past the plunger.

Figure 6:
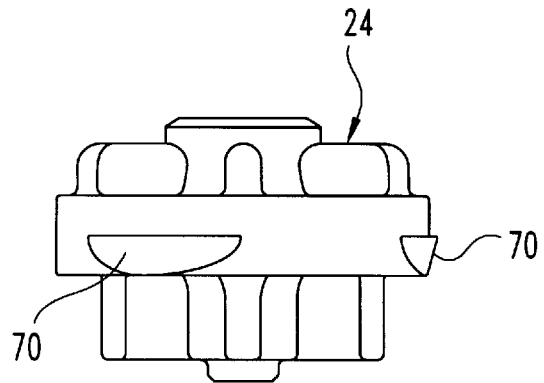
FIG. 6 is a side view of the valve seat of the solenoid actuated valve of FIG. 1.
Figure 7:
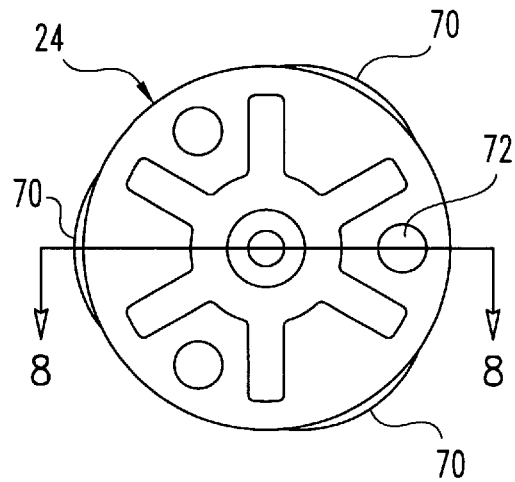
FIG. 7 is a bottom view of the valve seat of FIG. 6.
Figure 8:
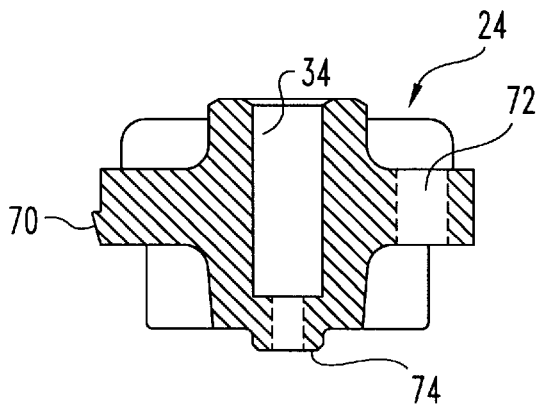
FIG. 8 is a cross-sectional view of the valve seat of FIG. 6.

Further installed within internal passageway 38, is valve seat 24. Referring to FIGS. 6 through 8, valve seat 24 includes a series of projections 70, extending around the exterior circumference of the valve seat. It will be understood that these projections are received within groove 52 (FIG. 4) defined in the connection assembly 50 to thereby securely hold valve seat 24 in the desired position. Valve seat 24 further includes an internal passageway 34 extending along the longitudinal axis 33 and a series of fluid apertures 72. Valve seat 24 also includes a valve seat face 74 for engagement with valve pad 36 (FIG. 2) of plunger 28. It will be understood that when valve pad 36 and valve face 74 are in engagement, fluid flow through internal passageway 34 of valve seat 24 is prevented.

Although valve seat 24 is shown for use in the preferred embodiment, it is contemplated that the plunger and valve seat may be replaced with alternative configurations, provided they are sized to be received within internal passage 38 and valve connector assembly 50, respectively. Moreover, valve seat 24 may be removed and an alternative valve seat may be snap-fit into groove 52.

In the final assembly shown in FIGS. 1 and 2, the entire bobbin and coil area is encapsulated in an encapsulation material 16 to prevent coil contact with the external environment. In a preferred embodiment the encapsulation material is formed of a fiber filled molding compound. One such product is a copolymer polyester molding compound available from Seegott, Inc. under the tradename CYGLAS, product number 7085L. As known in the art, a variety of encapsulation materials are available and may be used provided they have sufficient electrical insulation, thermal dissipation and water resistance. It will be understood that this encapsulation is intended to provide a barrier resistant to elements which may adversely affect the operation of the electrical components, specifically coil 14, of the solenoid actuator. As shown in FIG. 1, the external configuration of the encapsulation material may form the shape of a hexagon such that it may be easily manipulated by a tool to ensure a tight threaded engagement with an internally threaded nut of the fluid source (not shown).

As shown in FIG. 3, electrical leads 18 and 20 extend from the electrical lead supports 58 and 60, respectively, along the entire axial length of the coil and exit the encapsulation material 16 at a point farthest away from their connection to the coil. It will be understood that encapsulation of the leads over the entire length of the coil enhances the water resistant properties of the solenoid actuator valve according to the present invention by creating an elongated fluid wicking path along electrical leads 18 and 20.

Figure 4:
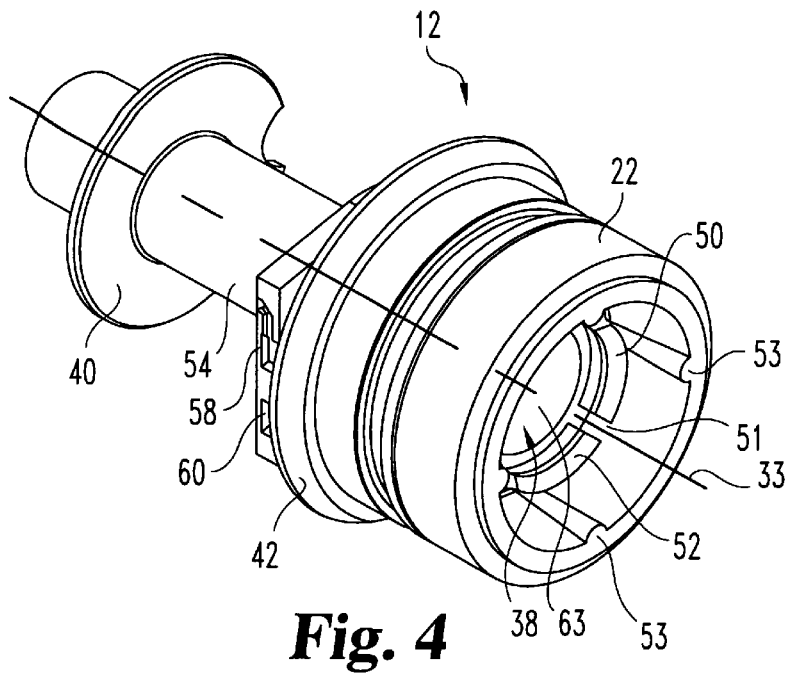
FIG. 4 is a perspective view of the bobbin and valve housing of the solenoid actuated valve of FIG. 1.

The device according to the present invention is assembled in the following steps. Initially, the unitary bobbin and valve housing 12 is formed of a molded nylon with the features described above. As shown in FIG. 4, the internal surface adjacent the open end of the housing includes four projections 53. These projections are useful in the molding process to provide a channel for material flow. Additionally, the mold (not shown) for housing 12 includes interchangeable elements to form various thread patterns on externally threaded area 22. In the bobbin area 54 between ribs 40 and 42, deformable wall 80 defining a portion of internal passage 38 is preferably formed so that at least a portion thereof is deformable to alter the shape of substantially cylindrical internal passageway 38. Preferably, the deformable portion of deformable wall 80 extends uniformly around the circumference of internal passageway 38 to permit uniform deformation against core 26.

Figure 5:
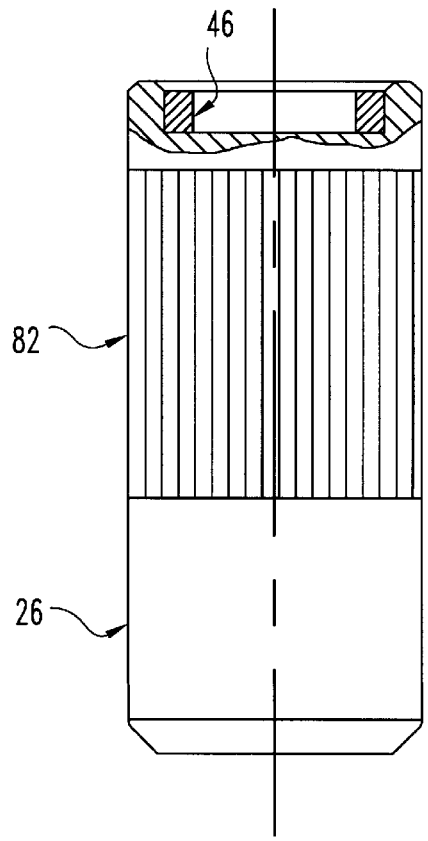
FIG. 5 is a partial cross-sectional view of the core of the solenoid actuated valve of FIG. 1.

Core 26 is inserted within internal passageway 38 adjacent end wall 62. It will be understood that core 26 can be affixed in its position as is well known in the art. However, in a preferred embodiment of the present invention, core 26 includes a roughened surface 82 (FIG. 5) which will more readily engage the interior wall of passageway 38. As shown in FIG. 5, this roughened surface can take the form of a series of grooves 82 or a knurling pattern on the exterior surface of core 26. Once core 26 has been properly positioned adjacent end wall 62, an electrical conductor is wound around the bobbin area 54 between left rib 40 and right rib 42 and electrical leads 18 and 20 are connected. In one form of the present invention, wall 80 forming a portion of internal passageway 38 is deformable to reduce the circumference of internal passageway 38. In this embodiment, winding of the electrical conductor around bobbin area 54 deforms wall 80 to urge it against the outer surface of core 26. Thus, the winding pressure of the coil is utilized to fixedly secure the core in the desired position without the use of additional adhesives or other elements. Moreover, uniform pressure applied by the coil winding tends to center core 26 within the coil 14 to maximize magnetic performance.

Once core 26 is securely positioned, plunger 28 is fitted with a valve pad 36 and helical spring 32 is positioned within recess 48 of the plunger. The plunger assembly is then inserted in internal passageway 38 and adjacent core 26. Plunger 28 is slidably disposed within the internal passageway with spring 32 engaging shoulder 64. Plunger 28 reciprocates along the longitudinal axis of the internal passageway. Valve seat 24 is then positioned in alignment with the internal passageway and advanced toward end wall 62 until projections 70 are forced into groove 52 to securely hold the valve seat in position with valve face 74 adjacent valve pad 36. Magnetically responsive U-bracket 30 is then positioned about the coil as shown in FIGS. 2 and 3. The entire assembly is encapsulated in encapsulation material 16 to provide a fluid resistant assembly.

It will be appreciated by those skilled in the art that there are no joints within bobbin and valve housing 12 subjected to pressurized fluid such that fluid might create or find a path to the electrically energized components of the device. Moreover, the connection assembly permits easy adaptation of the valve housing to suit a number of different valve configurations without disturbing the fluid isolation elements of the device.

In operation, with coil 14 de-energized, spring 32 urges plunger 28 towards valve seat 24. In this position, valve pad 36 engages valve face 74 to prevent fluid flow through passage 34 in the valve seat. When coil 14 is energized, core 26 magnetically attracts plunger 28 with sufficient force to overcome spring 32 and thereby displace valve pad 36 from valve face 74. Fluid is then permitted to flow through passages 34 and 72 of the valve seat. Fluid flow is continued until coil 14 is de-energized and spring 32 urges plunger 26 into engagement with valve seat 24.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A solenoid actuated valve assembly, comprising:
   a unitary valve housing having a longitudinal axis, an external surface and an internal surface defining an internal passageway extending along at least a portion of said longitudinal axis from a closed end to an opposite open end, said unitary valve housing defining a valve connection assembly adjacent said open end and said external surface defining a bobbin area coaxial with said longitudinal axis;
   a core disposed within said internal passageway adjacent said closed end, said core having a roughened surface for engaging said internal passageway whereby said core is secured within said internal passageway;
   a reciprocable plunger slidably disposed within said internal passage, said plunger having a distal end positioned adjacent said core and an opposite proximal end having a first valve member;
   an energizing coil supported on said bobbin area in a coaxial relationship with at least a portion of said internal passageway; and
   a second valve member interconnected with said valve connection assembly, whereby said first valve member selectively engages said second valve member to control fluid flow between said first valve member and second valve member.

2. The solenoid actuated valve assembly of claim 1, wherein said unitary valve housing further defines a fluid source mating assembly adjacent said open end.

3. The solenoid actuated valve assembly of claim 2, wherein said fluid source mating assembly is a series of external threads on said external surface adjacent said open end for receiving a corresponding internally threaded connector.

4. The solenoid actuated valve assembly of claim 1, wherein said bobbin area includes a deformable portion, said deformable portion deformed in response to coil winding pressure to urge said internal passageway into engagement with said core.

5. The solenoid actuated valve assembly of claim 1, wherein said roughened surface covers only a portion of said external surface.

6. The solenoid actuated valve assembly of claim 1, wherein said roughened surface is grooved.

7. The solenoid actuated valve assembly of claim 1, wherein said external surface includes a pair of opposing external ribs defining said bobbin area.

8. The solenoid actuated valve assembly of claim 1, wherein said valve connection assembly is an annular groove formed in said internal surface and said first valve member includes correspondingly sized projections for engagement in said groove.

9. The solenoid actuated valve assembly 1, wherein said first valve member is a valve seal and said second valve member is a valve seat.

10. A solenoid actuated valve assembly, comprising:
a valve housing having a longitudinal axis, said housing defining an internal passageway extending along said longitudinal axis and an external surface defining a bobbin housing having a deformable portion;
a core disposed within said internal passageway, at least a portion of said core disposed within said bobbin housing adjacent said deformable portion, said core including a roughened exterior surface; and
a coil supported on said bobbing housing, said coil deforming said deformable portion into contact with said core, whereby said core is maintained in position within said internal passageway.

11. The solenoid actuated valve assembly of claim 10, wherein said internal passageway is substantially cylindrical and said deformable portion extends uniformly about said internal passageway whereby said core is centered within said coil.

12. The solenoid actuated valve assembly of claim 10, wherein said internal passageway includes a bobbin end and an opposite fluid connection end, said bobbin end including an end wall sealing said internal passageway and said core abuttingly engaging said end wall.

13. The solenoid valve assembly of claim 10, wherein said roughed exterior surface includes grooves.

14. The solenoid valve assembly of claim 10, wherein said valve housing is formed of reinforced nylon.

15. The solenoid valve assembly of claim 10, wherein said roughed surface extends over only a portion of the core.

16. A method for assembling a fluid resistant solenoid actuated valve, comprising:
providing a unitary bobbin and valve assembly, said assembly having a longitudinal axis and defining an interior passageway extending along the longitudinal axis and adapted to receive a magnetically responsive core and plunger, said interior passageway having an open end for a fluid connection and an opposite closed end;
inserting a core in the interior passageway and positioning the core adjacent the closed end with a portion thereof extending within the bobbin, said core having a roughened exterior for engaging said interior passageway whereby said core can be secured within said interior passageway;
winding an electrical conductor around the bobbin to form a coil;
inserting a plunger and valve assembly into the interior passageway;
inserting and securing a valve seat in the interior passageway; and
electrically connecting leads to the coil.

17. The method of claim 16, wherein said core is positioned within said bobbin prior to said winding.

18. The method of claim 17, wherein said bobbin assembly deforms during said winding to securely engage said core and maintain it in position.

19. The method of claim 16, wherein said coil includes a first end and an opposite second end and interconnecting leads to the coil includes electrically connecting the leads to the first end and positioning the leads along substantially the entire length of the coil to extend beyond the second end.

20. The method of claim 16, wherein said unitary bobbin and valve assembly includes a circular recess in the passageway adjacent the fluid end and interconnecting the plunger stop to the valve assembly includes snapping the valve seat into the circular recess.

21. A solenoid valve assembly, comprising:
a unitary valve housing defining:
a bobbin housing for receiving a coil, said bobbin housing having a deformable portion;
an internal passageway having a longitudinal axis, said passageway adapted to receive a core and a plunger, said internal passageway extending within at least a portion of said bobbin housing and having an open end and an opposite closed end; and
a valve seat connection assembly disposed adjacent said open end;
a core disposed within said internal passage adjacent said closed end, said core having a roughened surface for engaging said internal passageway whereby said core is secured within said internal passageway;
a reciprocable plunger slidably disposed within said internal passage;
a valve member mounted on said reciprocable plunger;
an electric energizing coil supported on said bobbin housing in a coaxial relationship therewith, said coil having a first end and an opposite second end, said coil deforming said deformable portion of said bobbin to secure said core in position within said internal passage;
a valve seat interconnected with said valve seat connection assembly, whereby said valve member selectively engages said valve seat to control fluid flow; and
a pair of electrical leads electrically connected to said coil at said first end and extending parallel to said longitudinal axis beyond said second end.

* * * * *